(12) United States Patent
Morris et al.

(10) Patent No.: US 7,888,296 B2
(45) Date of Patent: Feb. 15, 2011

(54) COMPOSITION AND METHOD FOR RECOVERING HYDROCARBON FLUIDS FROM A SUBTERRANEAN RESERVOIR

(75) Inventors: John D. Morris, Naperville, IL (US); Kin-Tai Chang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 65 days.

(21) Appl. No.: 12/426,569

(22) Filed: Apr. 20, 2009

(65) Prior Publication Data

US 2009/0264322 A1    Oct. 22, 2009

Related U.S. Application Data

(60) Provisional application No. 61/046,723, filed on Apr. 21, 2008.

(51) Int. Cl.
*C09K 8/60* (2006.01)
*E21B 43/16* (2006.01)

(52) U.S. Cl. .............. 507/219; 166/305.1; 507/224; 516/53

(58) Field of Classification Search .......... 507/219, 507/224; 166/305.1; 516/53
See application file for complete search history.

(56) References Cited

U.S. PATENT DOCUMENTS

| 4,148,746 A * | 4/1979 | Klemmensen et al. ...... 507/224 |
| 4,836,282 A * | 6/1989 | Hsieh ..................... 166/270.1 |
| 5,465,792 A | 11/1995 | Dawson et al. |
| 5,701,955 A | 12/1997 | Frampton |
| 5,735,349 A | 4/1998 | Dawson et al. |
| 6,454,003 B1 | 9/2002 | Chang et al. |
| 6,569,983 B1 | 5/2003 | Treybig et al. |
| 6,620,878 B1 * | 9/2003 | Lyons et al. ................ 524/515 |
| 6,729,402 B2 | 5/2004 | Chang et al. |
| 6,984,705 B2 | 1/2006 | Chang et al. |
| 7,300,973 B2 | 11/2007 | Chang et al. |
| 2007/0204989 A1 | 9/2007 | Tang |

FOREIGN PATENT DOCUMENTS

GB    2262117    9/1993

OTHER PUBLICATIONS

International Search Report for PCT/US2009/041189.*
Written Opinion of the International Searching Authority for PCT/US2009/041189.*

* cited by examiner

*Primary Examiner*—Timothy J. Kugel
(74) *Attorney, Agent, or Firm*—Michael B. Martin

(57) ABSTRACT

This invention is directed to a composition comprising expandable polymeric microparticles comprising hydrophobic polymers having a backbone with labile pendant groups, the microparticles having an unexpanded volume average particle size diameter of from about 0.05 to about 5,000 microns. Labile pendant groups on the backbone are subject to hydrolysis under a change in environmental conditions that results in expansion of the microparticle. The invention is further directed to the use of the composition for modifying the permeability of subterranean formations and increasing the mobilization and/or recovery rate of hydrocarbon fluids present in the formations.

20 Claims, No Drawings

COMPOSITION AND METHOD FOR RECOVERING HYDROCARBON FLUIDS FROM A SUBTERRANEAN RESERVOIR

CROSS-REFERENCE TO RELATED APPLICATIONS

This application claims benefit of U.S. Provisional Patent Application No. 61/046,723, filed Apr. 21, 2008.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

FIELD OF THE INVENTION

This invention relates to compositions and methods for the recovery of hydrocarbon fluids from a subterranean reservoir and more particularly to an expandable polymeric microparticle composition that modifies the permeability of subterranean formations, thereby increasing the mobilization and/or recovery rate of hydrocarbon fluids present in the formations.

BACKGROUND

In the first stage of hydrocarbon recovery an energy source present in a reservoir is allowed to move to a producing wells(s) where the hydrocarbon can flow or be pumped to a surface handling facility. Typically a relatively small proportion of reservoir hydrocarbon can be recovered by this means. To increase production fluids are injected down adjacent wells to force an additional amount of hydrocarbon to the surface. This is commonly known as secondary recovery. The fluids normally used are water (such as aquifer water, river water, sea water, or produced water), or gas (such as produced gas, carbon dioxide, flue gas and various others). Additionally, if the fluid encourages movement of normally immobile residual oil or other hydrocarbons, such a process is termed tertiary recovery.

A prevalent problem with secondary and tertiary recovery projects relates to the heterogeneity of the reservoir rock strata. The mobility of the injected fluid typically is different from the hydrocarbon. For instance, when the fluid is more mobile various mobility control processes are required to make the sweep of the reservoir more uniform and the consequent hydrocarbon recovery more efficient. Unfortunately such processes have limited value when high permeability zones, commonly called thief zones or streaks, exist within the reservoir rock. The injected fluid follows a low resistance route from the injection well to the production well. In such cases the injected fluid does not effectively sweep the hydrocarbon from adjacent, lower permeability zones. Further, when the produced fluid is re-used this can lead to fluid cycling through the thief zone with little resulting benefit and at great cost in terms of fuel and maintenance of the pumping system.

Numerous physical and chemical methods have been used to divert injected fluids out of the thief zones and into or near production and injection wells. When the treatment is applied to a producing well it is usually termed a water (or gas etc.) shut-off treatment. When it is applied to an injection well it is termed a profile control or conformance control treatment.

In cases where the thief zone(s) are isolated from the lower permeability adjacent zones, mechanical seals or "plugs" can be set in the well to block the entrance of the injected fluid. If the fluid enters or leaves the formation from the bottom of the well, cement can also be used to fill the well bore to above the zone of ingress.

When the completion of the well allows the injected fluid to enter both the thief and the adjacent zones, a cement squeeze is often a suitable means of isolating the watered out zone. Certain cases, however, are not amenable to such methods because communication exists between layers of the reservoir rock outside the reach of cement. Typical examples of this are when fractures or rubble zones or washed out caverns exist behind the casing. In such instances chemical gels, capable of moving through pores in reservoir rock have been applied to seal the swept out zones.

When such methods fail the only remaining alternatives are to produce the well with poor recovery rate, sidetrack the well away from the prematurely swept zone, or abandon the well. Occasionally the producing well is converted to a fluid injector to increase the field injection rate above the net hydrocarbon extraction rate and increase the pressure in the reservoir. This can lead to improved overall recovery, but it is worth noting that the injected fluid will mostly enter the thief zone at the new injector and is likely to cause similar problems in nearby wells. Further, all of these methods are expensive.

Near wellbore conformance control methods always fail when the thief zone is in widespread contact with the adjacent, hydrocarbon containing, lower permeability zones. The reason for this is that the injected fluids can bypass the treatment and re-enter the thief zone having only contacted little or none of the remaining hydrocarbon. It is commonly known amongst those skilled in the art, that such near wellbore treatments do not succeed in significantly improving recovery in reservoirs having crossflow of the injected fluids between zones.

A few processes have been developed with the aim of reducing the permeability in a substantial proportion of the thief zone and, or at a significant distance from the injection and production wells. One example of this is the Deep Diverting Gel process patented by Morgan et al (1). This has been used in the field and suffered from sensitivity to unavoidable variations in quality of the reagents which resulted in poor propagation. The gellant mixture is a two component formulation and it is believed that this contributed to poor propagation of the treatment into the formation.

The use of swellable cross linked superabsorbent polymer microparticles for modifying the permeability of subterranean formations is disclosed in U.S. Pat. Nos. 5,465,792 and 5,735,349. However, swelling of the superabsorbent microparticles described therein is induced by changes of the carrier fluid from hydrocarbon to aqueous or from water of high salinity to water of low salinity.

Crosslinked, expandable polymeric microparticles and their use for modifying the permeability of subterranean formations and increasing the mobilization and/or recovery rate of hydrocarbon fluids present in the formation are disclosed in U.S. Pat. Nos. 6,454,003 B1, 6,709,402 B2, 6,984,705 B2 and 7,300,973 B2 and in published U.S. Patent Application No. 2007/0204989 A1.

SUMMARY

We have discovered novel expandable polymeric microparticles comprising hydrophobic polymers having a backbone with labile pendant groups. The microparticles have an unexpanded volume average particle size diameter of from about 0.05 to about 5,000 microns. The initial microparticle conformation and unexpanded size are initially determined by the labile pendant groups. Once formed from the hydrophobic polymers, the microparticles maintain their unexpanded size until a desired activating event induces hydrolysis of the labile pendant groups. The polymers then become increasingly hydrophilic and the microparticle thus also becomes hydrophilic, absorbing fluid and thus expanding the microparticle. The unexpanded hydrophobic microparticle properties, such as average particle size distribution and density, allow for efficient propagation through the pore structure of hydrocarbon reservoir matrix rock, such as sandstone. On exposing the hydrophobic microparticles to an activating event such as a change in temperature and/or at a predetermined pH sufficient to hydrolyze the labile pendant groups, the microparticle expands by absorbing the injection fluid (normally water).

The ability of the microparticle to expand from its original size (at the point of injection) depends on the presence of conditions that induce the hydrolysis of the labile pendant groups in the polymers forming the microparticle. The particles of this invention can propagate through the porous structure of the reservoir without using a designated fluid or fluid with salinity higher than the reservoir fluid.

The expanded polymeric microparticle is engineered to have a particle size distribution and physical characteristics, for example, particle rheology, that allow it to impede the flow of injected fluid in the pore structure. In doing so it is capable of diverting chase fluid into less thoroughly swept zones of the reservoir.

The rheology and expanded particle size of the particle can be designed to suit the reservoir target. For example, characteristics of a microparticle for use in a particular reservoir are influenced by selecting a particular backbone monomer or comonomer ratio in the polymer.

Accordingly, this invention can be directed to an expandable polymeric microparticle composition comprising hydrophobic polymers having a backbone comprising labile pendant groups, the microparticles having an unexpanded volume average particle size diameter of from about 0.05 to about 5,000 microns. The invention is further directed to a method of modifying the water permeability of a subterranean formation by injecting into the subterranean formation an expandable polymeric microparticle composition comprising hydrophobic polymers having a backbone with labile pendant groups, the microparticles having an unexpanded volume average particle size diameter of from about 0.05 to about 5,000 microns.

DETAILED DESCRIPTION

Definitions of Terms

"Anionic monomer" means a monomer as defined herein which possesses an acidic functional group and the base addition salts thereof. Representative anionic monomers include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, the quaternary salts of acrylic acid and methacrylic acid such as ammonium acrylate and ammonium methacrylate, and the like. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

"Anionic polymeric microparticle" means a crosslinked polymeric microparticle containing a net negative charge.

"Betaine monomer" means a monomer containing cationically and anionically charged functionality in equal proportions, such that the monomer is net neutral overall. Representative betaine monomers include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, and the like. A preferred betaine monomer is N,N-dimethyl-N-methacryloyloxyethyl-N-(3-sulfopropyl)-ammonium betaine.

"Cationic Monomer" means a monomer unit as defined herein which possesses a net positive charge. Representative cationic monomers include the quaternary or acid salts of dialkylaminoalkyl acrylates and methacrylates such as dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyidimethyl ammonium chloride is more preferred.

"Cross linking monomer" means an ethylenically unsaturated monomer containing at least two sites of ethylenic unsaturation, which may be added to constrain the microparticle conformation of the polymeric microparticles of this invention. The level of any cross linking agents used in these polymer microparticles is selected to maintain a rigid non-expandable microparticle configuration. Cross linking monomers according to this invention could include both labile cross linking monomers and non-labile cross linking monomers.

"Water continuous emulsion" and "water continuous microemulsion" mean an oil-in-water emulsion comprising a substantially hydrophobic, water insoluble polymeric microparticle according to this invention dispersed in a continuous water phase. Emulsions polymers of this nature can be formed from lower primary alkyl acrylate monomers as described, for example in U.S. Pat. Nos. 3,755,531 and 6,048,463.

"Fluid mobility" means a ratio that defines how readily a fluid moves through a porous medium. This ratio is known as the mobility and is expressed as the ratio of the permeability of the porous medium to the viscosity for a given fluid.

1. EQUATION 1 for a single fluid x flowing in a porous medium.

$$\lambda = \frac{k_x}{\eta_x}$$

When more than one fluid is flowing the end point relative permeabilities must be substituted for the absolute permeability used in equation 1.

2. EQUATION 2 for a fluid x flowing in a porous medium in the presence of one or more other fluids.

$$\lambda_x = \frac{k_{rx}}{\eta_x}$$

When two or more fluids are flowing the fluid mobilities may be used to define a Mobility ratio:

3. EQUATION 3

$$M = \frac{\lambda_x}{\lambda_y} = \frac{\eta_y k_{rx}}{\eta_x k_{ry}}$$

The mobility ratio is used in the study of fluid displacement, for example in water flooding of an oil reservoir where x is water and y is oil, because the efficiency of the displacement process can be related to it. As a general principle at a mobility ratio of 1 the fluid front moves almost in a "Plug flow" manner and the sweep of the reservoir is good. When the mobility of the water is ten times greater than the oil viscous instabilities, known as fingering, develop and the sweep of the reservoir is poor. When the mobility of the oil is ten times greater than the water the sweep of the reservoir is almost total.

"Labile cross linking monomer" means a cross linking monomer which can be degraded by certain conditions of heat, pH or a combination thereof, after it has been incorporated into the polymer structure, to reduce the degree of crosslinking in the polymeric microparticle. The aforementioned conditions are such that they can cleave bonds in the "cross linking monomer" without substantially degrading the rest of the polymer backbone. Representative labile cross linking monomers include diacrylamides and methacrylamides of diamines such as the diacrylamide of piperazine, acrylate or methacrylate esters of di, tri, tetrahydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isbutyric acid) and the vinyl or allyl esters of di or tri functional acids. Preferred labile cross linking monomers include water soluble diacrylates such as PEG 200 diacrylate and PEG 400 diacrylate and polyfunctional vinyl derivatives of a polyalcohol such as ethoxylated (9-20) trimethylol triacrylate. The labile cross linker may be present in an amount of from about 100 to about 200,000 ppm. In alternative aspects, the labile cross linker is present in the amount of about 1,000 to about 200,000 ppm, about 9,000 to about 200,000 ppm, about 9,000 to about 100,000 ppm, about 20,000 to about 60,000, about 1,000 to about 20,000 ppm or about 500 to about 50,000 ppm based on total moles of monomer.

"Hydrophobic polymer" means a polymer that comprises hydrophobic moieties appended to the polymer backbone where the hydrophobic moieties can be degraded by certain conditions such as a change in temperature, pH or other activating event to increase the hydrophilicity of the polymer, thereby permitting the polymer to expand by absorption of water from the injection fluid and/or the subterranean formation. Hydrophobic polymers may further comprise non-labile monomers which are not susceptible to hydrolysis and/or water soluble monomers whether ionic or nonionic so long as the level and nature of non-labile monomers and water soluble monomers does not significantly alter hydrophobic nature of the polymer or its expansion.

The hydrophobic polymers are prepared by polymerizing one or monomers which comprise labile groups ("labile monomers"). Representative labile monomers include vinyl acetate, acrylonitrile, vinylformamide $C_1$-$C_{20}$ alkyl esters of acrylic acid, methyl methacrylate, and combinations thereof. The alkyl ester can be a straight or branched chain, and may contain aliphatic and/or aromatic groups.

"Monomer" means a polymerizable allylic, vinylic or acrylic compound. The monomer may be anionic, cationic, nonionic or betaine. Vinyl monomers are preferred, acrylic monomers are more preferred.

"Nonionic monomer" means a monomer as defined herein which is electrically neutral. Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

"Non-labile cross linking monomer" means a cross linking monomer which is not degraded under the conditions of temperature and/or pH which would cause incorporated labile cross linking monomer to disintegrate. Non-labile cross linking monomer may be added, in addition to any labile cross linking monomer, to control the expanded conformation of the polymeric microparticle. Representative non-labile cross linking monomers include methylene bisacrylamide, diallylamine, triallylamine, divinyl sulfone, diethyleneglycol diallyl ether, and the like. A preferred non-labile cross linking monomer is methylene bisacrylamide. The non-labile cross linker may be present in the expandable microparticles in an amount of from 0 to about 300 ppm, in another aspect from about 2 to about 300 ppm, in another aspect from about 0 to about 200 ppm, in another aspect from about 0 to about 100 ppm, in another aspect from about 01 to about 300 ppm, in another aspect from about 2 to about 300 ppm and in another aspect from about 5 to about 300 ppm based on total moles of monomer.

As disclosed herein, hydrophobic polymers are used to make expandable polymeric microparticles as otherwise described in U.S. Pat. Nos. 6,454,003 B1, 6,709,402 B2, 6,984,705 B2 and 7,300,973 B2 and in published U.S. Patent Application No. 2007/0204989 A1. An advantage of using hydrophobic polymers with labile pendant groups to create the expandable microparticles of the present invention is that labile crosslinks are not required to achieve expandability of the microparticle. For example, a microparticle made of a hydrophobic polymer with all non-labile crosslinks and labile pendant groups will function very similarly to the polymeric microparticles described in U.S. Pat. Nos. 6,454,003 B1, 6,709,402 B2, 6,984,705 B2, 7,300,973 B2 and U.S. Patent Application No. 2007/0204989 A1, i.e. without requiring the labile crosslinks. However, hydrophobic polymers with labile crosslinks may be used. Upon hydrolysis of the labile pendant groups, the polymer becomes hydrophilic, absorbs fluid such as the carrier fluid, and thereby expands. No special carrier fluid is needed.

Hydrophobic polymers according to this invention may be prepared using methods known in the art. For example, emulsions of polymers formed from lower primary alkyl acrylate monomers are described, in U.S. Pat. Nos. 3,755,531 and 6,048,463. The hydrophobic polymers can be made as water continuous emulsions comprised of a polyacrylic acid ester, or a copolymer of an acrylic acid ester with comonomers copolymerized with the acrylic acid ester. The polyacrylic acid ester is for example any primary alkyl ester of polyacrylic acid that can be hydrolyzed into metal salts (of polyacrylic acid) and the corresponding primary alcohols. Especially suitable for making the polymers are lower primary alkyl esters such as methyl, ethyl, propyl, butyl and amyl esters. Such polymers are synthesized by conventional free radical polymerization in an aqueous medium. Acrylic acid esters and comonomers are typically emulsified in water in the presence of surfactants. Polymerization additives such as inorganic salts, chelants, pH buffers, chain transfer agents and branching agents and non-labile and/or labile cross-linking monomers can also be used. Once the monomers are emulsified in the continuous phase, the polymerization is initiated using a redox couple typically added over a period of about 1 to about 5 hours with a controlled reaction temperature of 10-30° C. Changes can be made in the composition, operation, and arrangement of the method to tailor the composition to the application.

In an aspect, the hydrophobic polymers are prepared using an emulsion or microemulsion process to assure certain particle size range. In one aspect, the unexpanded volume average particle size diameter of the polymeric microparticle is about 0.05 to about 5,000 microns. In another aspect, the particle size diameter is about 0.05 to about 50 microns. In another aspect, the particle size diameter is about 0.1 to about 3 microns. In another aspect, the particle size diameter is about 0.1 to about 1 microns.

The hydrophobic polymer microparticle, upon hydrolysis of the labile pendant groups is converted into a hydrophilic microparticle. The resulting hydrophilic microparticle absorbs carrier fluid. This resulting polymer composition, due to its viscosity, changes the mobility of the fluid in a porous medium. The expanded hydrophilic microparticle is configured to have a particle size distribution and physical characteristics, for example rheology of a composition of the microparticles, sufficient to impede the flow of any fluid injected into the pore structure of a reservoir.

Thus, in one aspect, the hydrophobic polymers forming the expandable polymeric microparticles are any hydrophobic polymers with labile pendant groups, and which are capable of forming unexpanded polymeric particles having a diameter of 5,000 microns or less. When used with to refer to the pendant groups, the term "labile" means degradable, for example, photodegradable ozonolyzable, biodegradable, hydrolyzable or thermolyzable. In another aspect of the present invention, hydrophobic polymers with labile pendant groups form a microparticle that may be used advantageously in recovery of hydrocarbon from the subterranean formation.

Typically, the change in conditions mediating hydrolysis of the labile pendant groups is a change in temperature or pH within the subterranean formation. However, hydrophobic polymers may be formed with labile pendant groups that can be selected for susceptibility to degradation upon exposure to any one of a number activating events. Temperature and pH changes are exemplary activating events, but other activating events for sufficient degradation of labile pendant groups are contemplated, including a change in pressure, salinity, shear, or dilution. The activating event may be for example exposure to an activating agent such as exposure to an oxidant, a reductant, an acid, a base, a biological agent, an organic or inorganic cross-linking agent, or a salt, or to a combination thereof. Upon exposure to the activating event and consequent hydrolysis of the labile pendant groups, the expandable polymeric microparticles are free to expand to several times the original size of the microparticle while yet constrained by the initial configuration of the hydrophobic polymer.

In another aspect, this invention is a method for modifying permeability to water of a subterranean formation comprising injecting into the subterranean formation a composition comprising expandable polymeric microparticles comprising hydrophobic polymers having a backbone with labile pendant groups, the microparticles having a smaller diameter than the pores of the subterranean formation, wherein a change in environmental conditions of the composition in the subterranean formation causes the microparticles to become hydrophilic. The labile pendant groups degrade under a change in environmental conditions in the subterranean formation so that the expandable polymeric microparticles are free to expand. The composition then flows through a zone or zones of relatively high permeability in the subterranean formation under increasing temperature conditions, until the composition reaches a location where the temperature or pH is sufficiently high to promote degradation of the labile pendant groups.

In an embodiment, about 100 ppm to about 100,000 ppm of the composition, based on polymer actives, is added to the subterranean formation. In another embodiment, about 500 ppm to about 10,000 ppm of the composition is added to the subterranean formation. In another embodiment, about 500 ppm to about 1000 ppm is added to the subterranean formation. The subterranean formation is for example a sandstone or carbonate hydrocarbon reservoir. In an embodiment, the composition is added to injection water as part of a secondary or tertiary process for the recovery of hydrocarbon from the subterranean formation. The injection water is added to the subterranean formation, for example a producing well, at a temperature lower than the temperature of the subterranean formation. The higher temperature within the formation induces hydrolysis of the labile pendant groups. In another aspect, the method may further involve introducing a change in the environmental conditions of the composition, wherein the change causes the hydrolysis of the labile pendant groups. The change in environmental conditions may be a change in pressure, salinity, shear force, or in dilution of the composition.

Unlike conventional blocking agents such as polymer solutions and polymer gels that cannot penetrate far and deep into the formation, the composition of this invention, due to the size of the particles and low viscosity, can propagate far from the injection point until it encounters the high temperature zone.

The rate of expansion is primarily dependent on the rate of hydrolysis of the labile pendant groups. In particular, different labile pendant groups have different rates of bond cleavage at different temperatures and environmental conditions. It is well known that carboxylic acid esters undergo hydrolysis process to degrade into corresponding carboxylic acid and alcohol at certain conditions. Ester hydrolysis has been shown to be accelerated by both acid and base so that ester hydrolysis rate is pH dependent. Base catalyzed hydrolysis is the most important pathway of ester degradation due to its much larger hydrolysis rate constant, for example, the rate constant of ethyl acetate hydrolysis in basic conditions ($k_B$) is about $0.11\ M^{-1} \cdot S^{-1}$, while the rate constant of ethyl acetate hydrolysis in acid conditions ($k_A$) is about $1.1 \times 10^{-4}\ M^{-1} \cdot S^{-1}$. The half-life of ethyl acetate at pH=7 and 25° C. is calculated to be about two years, but its half-life becomes about five days at pH=9, and it further decreases to few hours if solution pH is increased to 10. In conclusion, most esters are stable in neutral or mild acidic environment, they become less stable and hydrolyze rapidly at higher pH conditions, and higher temperature can future enhance the degradation rate. Polymers such as poly(methyl acrylate), and poly(vinyl acetate) have similar ester functional groups as those of small molecules, these water insoluble polymers follow the similar hydrolysis kinetics of ethyl acetate. In an aspect of this invention, hydrophobic polymers are first prepared at lower pH conditions, and the resulting hydrophobic polymers become water soluble after hydrolyzing at higher pH conditions.

If labile crosslinkers are utilized, the reduction expansion of the microparticle is also dependent on the rate of cleavage of the labile crosslinker. In particular, different labile crosslinkers have different rates of bond cleavage at different temperatures. The temperature and mechanism depend on the nature of the cross-linking chemical bonds. For example, when the labile crosslinker is PEG diacrylate, hydrolysis of the ester linkage is the mechanism of de-crosslinking. Different esters have slightly different rates of hydrolysis. In general, methacrylate esters will hydrolyze at a slower rate than acrylate esters under similar conditions. With divinyl or diallyl compounds separated by an azo group such as the diallylamide of 2,2'-Azobis(isbutyric acid), the mechanism of de-crosslinking is elimination of a nitrogen molecule. As demonstrated by various azo initiators for free radical polymerization, different azo compounds indeed have different half-life temperatures for decomposition.

The rate of particle diameter expansion may also depend on the total amount of any crosslinking. We have observed that expandable crosslinked particles initially expand gradually as the amount of crosslinking first begins decreasing. After the total amount of crosslinking passes below a certain critical density, the viscosity increases explosively. Thus, by proper selection of the amount of crosslinker in the hydrophobic polymers, or of the level and type of labile pendant groups on the hydrophobic polymers, both temperature- and time-dependent expansion properties can be incorporated into the expandable polymer particles.

The particle size of the polymer particles before expansion is selected based on the calculated pore size of the highest permeability thief zone. The labile pendant group type and concentration, and hence the time delay before the injected particles begin to expand, is based on the temperature both near the injection well and deeper into the formation, the expected rate of movement of injected particles through the thief zone and the ease with which water can crossflow out of the thief zone into the adjacent, lower permeability, hydrocarbon containing zones. A polymer microparticle composition designed to incorporate the above considerations results in a better water block after particle expansion, and in a more optimum position in the formation.

The following examples are presented to describe preferred embodiments and utilities of the invention and are not meant to limit the invention unless otherwise stated in the claims appended hereto.

EXAMPLES

Examples 1-4

Preparation of Hydrophobic Polymers

Example 1

Representative hydrophobic polymers can be prepared as described in U.S. Pat. No. 6,048,463. The following procedure is utilized to synthesize a high molecular weight poly (methyl acrylate/acrylic acid) in 94/6 mole ratio. In a 1 liter polymerization flask fitted with baffles, 552.9 g of deionized water, 19.84 g of nonylphenol ethoxylate sulfate ammonium salt (58% solution), 17.44 g of Na dodecyl benzene sulfonate (23% solution), 3.88 g of EO-PO block copolymer and 0.096 g EDTA tetra sodium salt are taken and a solution is effected by mixing. To the clear solution, 0.19 g of Sag 2001 antifoam is added, nitrogen is sparged through the solution for 15 minutes and the solution is cooled down to 10° C.

Methyl acrylate (99%) 367.2 g, acrylic acid 19.19 g and formic acid 0.15 g are mixed in an addition funnel. A third of this mixture is added to the emulsifier solution in the reactor and the nitrogen sparge is continued for additional 10 minutes. Ferrous sulfate heptahydrate, 0.002 g, is dissolved in a mixture of sulfuric acid, 0.07 g, and water 6.9 g, and the potassium chlorate, 0.0019 g, is dissolved in water, 6.9 g. The initiator solutions are drawn into separate syringes and fitted into metered syringe pumps. The initiators are pumped in at a slow rate so as to maintain a constant reaction temperature, 10-13° C. When no more exotherm is seen, the initiator addition is stopped and another third of the monomer is added to the reactor. Polymerization is repeated as described above. Finally, the third lot of the monomer is added and completed the polymerization. After completing the polymerization, the reaction temperature is raised to 25° C. and held at that temperature for an hour so as to reduce the unreacted monomer level to <2%. The polymer is collected to determine the gel No. (100 mesh screen) and hydrolyzed in caustic at 1% emulsion concentration to determine the residual monomer by liquid chromatography (for acrylic acid) and the reduced specific viscosity/intrinsic viscosity/molecular weight. Polymers synthesized according to this general procedure are described in Table I.

Example 2

Another procedure utilized to synthesize a high molecular weight poly(methylacrylate/acrylic acid) in 97.5/2.5 mole ratio is as follows: In a 1 liter polymerization flask deionized water, 606.75 g, ammonium nonylphenol ethoxylate sulfate (58%) 54.3 g, octylphenol ethoxylate (70%) 4.9 g, EO-PO block copolymer 4.8 g, EDTA 0.2 g are weighed and mixed until a clear solution resulted. Then a silicone antifoam, 5 g, is added and nitrogen is sparged for 15 minutes with cooling down to 10° C.

Methyl acrylate (99%) 296.7 g, acrylic acid 6.3 g and formic acid, 0.15 g are placed in an addition funnel. A third of this mixture is added to the aqueous phase while nitrogen sparge is continued for 10 more minutes. Potassium chlorate, 0.0035 g is dissolved in 10.32 g of deionized water and the ferrous sulfate heptahydrate, 0.003 g is dissolved in sulfuric acid, 0.012 g, in water, 10.32 g. The initiator solutions are drawn into syringes and mounted onto separate syringe pumps. Polymers synthesized according to this general procedure are described in Table I.

Example 3

Low molecular weight poly(methyl acrylate/acrylic acid) polymer is obtained by using a procedure similar to that of Example 2 except that substantial amounts of isopropyl alcohol are used as the chain transfer agent in the monomer phase. The aqueous phase consisting of the emulsifiers as describe in Example 2 is used. The monomer phase consisted of methyl acrylate (99%) 296.6 g, and acrylic acid, 6.3 g, with isopropyl alcohol, 16 g. Tertiary butyl hydroperoxide (70%) 0.005 g is diluted with water, 10.32 g and ferrous sulfate heptahydrate, 0.0035, is dissolved in sulfuric acid, 0.012 g, in water, 10.32 g. The solutions are fed using piston pumps as described above. The reaction is initiated at 20° C. and maintained at 20-25° C. The reaction is post heated at 40° C./1 hour.

Example 4

The synthesis of poly(methyl acrylate) homopolymer is effected in the following manner. In a 1 liter polymerization flask fitted with baffles, 561.49 g of deionized water, 54.3 g of nonylphenol ethoxylate sulfate ammonium salt (58% solution), 4.9 g of octylphenol ethoxylate (70%), 4.8 g of EO-PO block copolymer, 0.1 g EDTA tetra sodium salt and sulfuric acid (0.02 g) are combined and a solution is effected by mixing. To the clear solution, 5.0 g of Sag 2001, antifoam is added, nitrogen is sparged through the solution for 15 minutes and the solution is cooled down to 10° C.

The monomer, methyl acrylate (99%) 353.54 g, and formic acid 0.175 g are mixed in an addition funnel. A third of the monomer is added to the emulsifier solution in the reactor and the nitrogen sparge is continued for additional 10 minutes. Ferrous sulfate heptahydrate, 0.002 g, is dissolved in sulfuric acid, 0.07 g, solution in water 6.9 g, and the potassium chlorate, 0.0019 g, is dissolved in water, 6.9 g. The initiator solutions are drawn into separate syringes and fitted into metered syringe pumps. The initiators are pumped in at a slow rate so as to maintain a constant reaction temperature, 10-13° C. When no more exotherm is seen, the initiator addition is stopped and another third of the monomer is added to the reactor. Polymerization is repeated as described above. Finally, the third lot of the monomer is added and completed the polymerization. After completing the polymerization, the reaction temperature is raised to 25° C. so as to reduce the unreacted monomer level to <2%. The polymer is collected to determine the gel No. (100 mesh screen) and hydrolyzed for 1 hour at 85° C. in caustic at 1% emulsion concentration to determine the residual monomer by liquid chromatography (for acrylic acid) and the reduced specific viscosity, intrinsic viscosity, and molecular weight. The hydrolyzed MA homopolymer had an RSV of 28.3 dL/g. This polymer has a molecular weight of between 4.4 and $5.2 \times 10^6$.

Table I illustrates the properties of the polymers made by the synthetic schemes described in Examples 1 and 2, labeled as polymers 1-8. Polymers 1-6 and 8 are synthesized according to the procedure in Example 1. Polymer 7, is synthesized according to the procedure in Example 2, and polymers 9 and 10 according to the procedure in Example 3.

TABLE I

| Polymer | pMA/AA, mole % | RSV[1] | IV[2] | IV[3] | Mw[4] (×10$^6$) |
|---|---|---|---|---|---|
| 1 | 94/6 | 50.7 | 32.5 | 32.0 | 8.13 |
| 2 | 94/6 | 49.1 | — | — | 7.82 |
| 3 | 94/6 | 44.7 | — | — | 7.19 |
| 4 | 94/6 | 37.1 | 23.6 | — | 5.86 |
| 5 | 94/6 | 34.4 | 23.0 | — | 5.71 |
| 6 | 94/6 | 34.3 | — | — | 5.65 |
| 7 | 97.5/2.5 | 30.0 | 20.9 | — | 5.18 |
| 8 | 94/6 | 26.3 | 17.8 | — | 4.4 |
| 9 | 97.5/2.5 | 21 | — | — | 3.6 |
| 10 | 97.5/2.5 | 14 | 11.4 | 12.7 | 2.8 |

[1] measured at polymer concentration as 0.04% p.AA in 2 N NaNO$_3$ at 30° C.
[2] in 2N NaNO$_3$ at 30° C.
[3] in 1N NaCl at 30° C.
[4] $\eta = 5.41 \times 10^{-6} [M_w]^{0.981}$ Methods practiced to characterize polymers are Reduced Specific Viscosity (RSV) and Intrinsic Viscosity (IV) measurements. The RSV measurement may be used indirectly to compare polymer molecular weight. If RSV versus polymer concentration is plotted and the linear curve is extrapolated to zero concentration (infinite dilute) the intercept is the IV. The IV value is used to estimate the viscosity average molecular weight of the polymer via the Mark-Houwink-Sakurada equation.

$$\eta = kMw^\alpha \text{ which upon rearrangement gives}$$

$$\text{viscosity average } Mw = [\eta/k]^{1/\alpha}$$

where η is the intrinsic viscosity and the coefficients k and α are constants for the particular polymer type, temperature and solvent system employed.

Upon complete hydrolysis of the methyl acrylate homopolymers (p.MA) or methyl acrylate/acrylic acid copolymers (p.MA/AA), a sodium acrylate polymer (p.NaAc) is formed. Thus, the coefficients $k=5.41 \times 10^{-6}$ and $\alpha=0.981$ for poly(sodium acrylate) in 1 M NaCl published by K. J. McCarthy, C. W. Burkhardt and D. P. Parazak (J. Applied Polymer Science, Vol. 33, pp 1683-1698, 1987) are used for molecular weight determinations in this work.

Reduced Specific Viscosity measurements are made using Cannon Ubbelohde semi-micro dilution viscometers (Size 75), at 30+ or 0.02° C. Unless noted, the RSV of all of the new oil-in-water polymers are determined at a constant polymer concentration, 0.04 wt % as p.AA, in a 2 N NaNO$_3$ solution (i.e., 17% NaNO$_3$). It is important to define these conditions, as the RSV value is dependent on polymer concentration and the concentration of salt. Thus, the intrinsic viscosity will also change with the solvent type and ionic strength used. For the anionic polymers considered in this work, for example, the IV value will increase as the ionic strength of the solvent is decreased (e.g., 1 N vs 2 N NaNO$_3$). Since there are no universal standards, great attention must be paid to (1) the conditions employed, and (2) the values used for the constants k and a in the Mark-Houwink-Sakurada equation, when comparing polymer molecular weights referred to in the literature or patents.

Example 5

Activation of Hydrophobic Polymers

Hydrolysis of Samples 1 and 5 in Table I above, at 1%, are performed at a lower temperature, 85° C., and at a NaOH/methyl acrylate ester mole ratio of 1 for 1, 2 and 3 hours.

Colloid titration was used to determine the anionic charge and the degree of hydrolysis. The Table II below summarizes the results.

TABLE II

| Polymer | Hydrolysis Time | % of Hydrolysis |
|---|---|---|
| 1 | 1 hr | 29 |
| 1 | 3 hr | 51 |
| 5 | 1 hr | 23 |
| 5 | 2 hr | 43.5 |
| 5 | 3 hr | 59 |

Example 10

Activation of the Polymeric Microparticle by Heat

As the particles expand in a medium of fixed volume, the volume fraction occupied by the particles increases. Consequently, the volume fraction of the continuous phase decreases. The decrease in free volume is reflected in an increase in the viscosity of the dispersion. Heat activation of the microparticles of this invention are demonstrated in a bottle test.

To carry out a bottle test, a dispersion containing 5000 ppm of the particles is prepared in an aqueous medium (e.g. a synthetic brine). Dispersing of particles is accomplished by vigorous stirring or by using a homogenizer. To prevent oxidative degradation of the expanding particles during monitoring, 1000 ppm sodium thiosulfate is added to the mixture as an oxygen scavenger.

The bottles are placed in a constant temperature oven to age. Then, at a predetermined time, a bottle is removed from the oven and cooled to 75° F. The viscosity is measured at 75° F. using Brookfield LV No. 1 spindle at 60 rpm (shear rate 13.2 sec−1).

Heat activation of the polymeric microparticles by heat is characterized by monitoring the viscosity change of aqueous dispersions of particles aged for increasing periods of time and at different temperatures.

Example 11

Sand Pack Test

This Example demonstrates that the polymeric microparticle of this invention can be propagated with a conformation constrained in part their hydrophobic nature and will expand in size when the labile pendant groups hydrolyze, to give a particle of suitable size to produce a substantial effect.

In the sand pack test, a 40 foot long sand pack of 0.25 inches internal diameter, made from degreased and cleaned 316 stainless steel tubing, is constructed in eight sections, fitted with pressure transducers, flushed with carbon dioxide gas and then placed in an oven and flooded with synthetic oil field injection water.

A dispersion of a representative polymeric microparticle is prepared in the synthetic injection water and injected into the pack to fill the pore volume. Pressure drops across the tube sections are monitored for signs of conformation change of the polymer particle as labile elements in the microparticle composition (which may include one or more of labile crosslinks, a labile core, or a labile shell) are hydrolysed. The "popping open" of the polymer particles is observed as a steep rise in the pressure drop. The sand pack test is described in detail in WO 01/96707.

The data for representative polymeric microparticles shows that the particles are able to travel through the first two sections of the sand pack without changing the RRF of the sections. However, particles in the last section, after accumulating a sufficient amount of residence time, have expanded and give a higher value of RRF. The higher RRF value is maintained after the injection fluid is changed from polymer dispersion to brine.

This example demonstrates that the polymeric microparticle composition can be propagated through a porous media. The microparticle will expand in size when the pendant labile groups hydrolyze, to give a particle of suitable size to produce a substantial effect, even in a high permeability porous medium.

It is to be understood that the specific embodiments of the present teachings as set forth herein are not intended as being exhaustive or limiting, and that many alternatives, modifications, and variations will be apparent to those of ordinary skill in the art in light of the foregoing examples and detailed description. Accordingly, the present teachings are intended to embrace all such alternatives, modifications, and variations that fall within the spirit and scope of the following claims.

All publications, patents, patent applications and other references cited in this application are herein incorporated by reference in their entirety as if each individual publication, patent, patent application or other reference are specifically and individually indicated to be incorporated by reference.

The invention claimed is:

1. A composition comprising expandable polymeric microparticles, the microparticles comprising hydrophobic polymers comprising labile pendant groups, wherein the microparticles have an unexpanded volume average particle size diameter of from about 0.05 to about 5,000 microns.

2. The composition of claim 1 comprising a water continuous emulsion of a polyacrylic acid ester.

3. The composition of claim 2 wherein the polyacrylic acid ester comprises a primary alkyl ester of polyacrylic acid.

4. The composition of claim 3 wherein the primary alkyl ester is selected from the group of methyl, ethyl, propyl, butyl and amyl esters.

5. The composition of claim 1 wherein the labile pendant groups are hydrolysable.

6. The composition of claim 5 wherein the pendant groups are hydrolysable upon a change in environmental conditions of the composition so that the microparticles become hydrophilic and thereby expand.

7. The composition of claim 1 wherein said hydrophobic polymers comprise one or more labile monomers.

8. The composition of claim 1 wherein said hydrophobic polymers comprise an acrylic acid ester and comonomers copolymerized with the acrylic acid ester.

9. A method for modifying permeability to water of a subterranean formation comprising injecting into the subterranean formation a composition according to claim 1, wherein the microparticles have a smaller diameter than the pores of the subterranean formation and wherein a change in environmental conditions of the composition in the subterranean formation causes the microparticles to become hydrophilic and expand.

10. The method of claim 9 wherein the composition is added to injection water as part of a secondary or tertiary process for the recovery of hydrocarbon from the subterranean formation.

11. The method of claim 10 wherein the injection water is added to the subterranean formation at a temperature lower than the temperature of the subterranean formation.

12. The method of claim 9 wherein the composition is used in a tertiary oil recovery process, one component of which constitutes water injection.

13. The method of claim 12 wherein the injection water is added to a producing well.

14. The method of claim 9 wherein the hydrophilic microparticles in the subterranean formation absorb a carrier fluid of the composition and thereby expand.

15. The method of claim 9 wherein the change in environmental conditions is an increase in temperature.

16. The method of claim 9 wherein the change in environmental conditions is a change in pH.

17. The method of claim 9 wherein when the microparticles expand, the viscosity of the composition increases.

18. The method of claim 9 wherein from about 100 ppm to about 100,000 ppm of the composition, based on polymer actives, is added to the subterranean formation.

19. The method of claim 9 wherein the composition is injected into the subterranean formation as part of a carbon dioxide and water tertiary recovery project.

20. The method of claim 9 wherein the subterranean formation is a sandstone or carbonate hydrocarbon reservoir.

\* \* \* \* \*